(12) United States Patent
Kashima

(10) Patent No.: US 7,515,441 B2
(45) Date of Patent: Apr. 7, 2009

(54) SWITCHING POWER SUPPLY

(75) Inventor: Masato Kashima, Tokyo (JP)

(73) Assignee: Fuji Electric Device Technology Co., Ltd., Tokyo (JP)

( * ) Notice: Subject to any disclaimer, the term of this patent is extended or adjusted under 35 U.S.C. 154(b) by 123 days.

(21) Appl. No.: 11/812,229

(22) Filed: Jun. 15, 2007

(65) Prior Publication Data
US 2008/0007975 A1 Jan. 10, 2008

(30) Foreign Application Priority Data
Jun. 16, 2006 (JP) .............. 2006-167546

(51) Int. Cl.
*H03M 3/335* (2006.01)
*H02M 3/24* (2006.01)
(52) U.S. Cl. .............. 363/21.01; 363/21.04; 363/21.12; 363/97
(58) Field of Classification Search .............. 363/21.01, 363/21.07, 21.08, 21.04, 21.12, 97
See application file for complete search history.

(56) References Cited

U.S. PATENT DOCUMENTS 6,314,005 B1 * 11/2001 Nishi et al. .............. 363/21.08
6,961,253 B1 * 11/2005 Cohen .......................... 363/97
7,239,532 B1 * 7/2007 Hsu et al. ................. 363/21.12

FOREIGN PATENT DOCUMENTS

JP 2004-040856 2/2004

* cited by examiner

*Primary Examiner*—Jessica Han
(74) *Attorney, Agent, or Firm*—Rabin & Berdo, PC

(57) ABSTRACT

A switching power supply, in which a switching element turns on and off electric current flowing on the primary side of an output transformer so as to rectify and output a pulsating flow generated on the secondary side of the output transformer, includes a voltage detecting section that detects an output voltage, a current detecting section that detects electric current flowing through a power transistor as the switching element, a controller that compares a voltage detection signal from the voltage detecting section and a current detection signal from the current detecting section to control the duty of the power transistor during an ON time, and a slope compensation circuit that compensates the rate of change of the voltage detection signal using a slope compensation signal. The slope compensation circuit subtracts the slope compensation signal from the voltage detection signal and outputs the resulting signal to a PWM comparator.

10 Claims, 10 Drawing Sheets

SWITCHING POWER SUPPLY

BACKGROUND OF THE INVENTION

1. Field of the Invention

The invention relates to a switching power supply that carries out current-mode control. In particular, the invention relates to a switching power supply that suppresses subharmonic oscillation of a pulse signal for current-mode control.

2. Description of the Related Art

In a switching power supply in which a switching element turns on and off, an electric current flows on the primary side of an output transformer so that a pulsating flow generated on the secondary side of the output transformer is rectified and output. In such a power supply, there may be a case where subharmonic oscillation of a pulse signal for current-mode control, which drives the switching element by PWM (pulse-width modulation), occurs during current-mode control. To cope with this, there has been proposed a switching power supply that suppresses such subharmonic oscillation (see e.g. Japanese Laid-Open Patent Publication (Kokai) No. 2004-40856).

The above subharmonic oscillation is a phenomenon where a lower frequency than the switching frequency is generated in a case where a power transistor used as a switching element is caused to operate with a duty cycle of not less than 50%. A mechanism for such subharmonic oscillation is that the difference between the initial value and the final value of inductor current flowing through an output transformer, which is connected in series to the power transistor, in each switching cycle increases over time since the rising slope and the falling slope of inductor current do not match during a switching period. The absolute value of the difference between the initial value and the final value of inductor current gradually increases and thereafter decreases upon the lapse of several periods. The repeated increase and decrease of the difference causes oscillation at a low frequency.

Accordingly, in the above switching power supply, the difference between the rising slope and the falling slope of the inductor current is corrected for by a slope compensation signal, and slope compensation is inhibited while the oscillation frequency changes when the power supply is under a light load, whereby the output voltage can be stabilized.

Although in the above switching power supply, the output voltage can be stabilized, since slope compensation is inhibited while the oscillation frequency changes when the switching power supply is under a light load, slope compensation is realized by superimposing (adding) a monotonously increasing slope compensation signal on a detection voltage proportional to inductor current. This may cause a problem, which is described below.

FIG. 6 is a circuit configuration diagram showing an example of a switching power supply that carries out current-mode control. The switching power supply in FIG. 6 is implemented by a flyback DC-DC converter. A switching element turns on and off electric current flowing on the primary side of an output transformer, and a pulsating current generated on the secondary side of the output transformer is rectified and output.

A commercial alternating current with a voltage of 100V is full-wave rectified by a bridge diode BD1. Direct current obtained by the full-wave rectification is smoothed by a capacitor C1 and supplied to a primary winding Tn1 of an output transformer T1 and a series circuit of an N-channel power transistor PT1, which is the switching element. Then, a controller 1, which may be implemented as an integrated circuit, turns on and off the power transistor PT1. A pulsating flow generated in a secondary winding Tn2 of the output transformer T1 is converted into a direct current by a diode D2 and a capacitor C3 and supplied to a load 2.

The output voltage supplied to the load 2 is detected by a voltage detecting circuit (voltage detector) 3, and the detected voltage is input as a feedback signal FB to a feedback terminal Tfb of the controller 1 via a photo-coupler PC1. The controller 1 is also equipped with a power supply terminal Tv to which a power supply voltage Vcc is to be input, a ground terminal Tg of a GND level, an output terminal for a PWM signal, and a current detection terminal Tis to which a current detection signal IS is to be input. A direct current voltage from the bridge diode BD1 is input to the power supply terminal Tv via a resistance R1. Also, a direct current voltage obtained through rectification of an output from an auxiliary winding Tn3 of the output transformer T1 by a diode D1 and a capacitor C2 is input to the power supply terminal Tv. The current detection signal IS, obtained through detection of electric current flowing through the power transistor PT1 by a resistance (current detector) R2, is input to the current detection terminal Tis.

Also, a CR filter comprised of a resistance R3 and a capacitor C4 is interposed between the resistance R2 and the current detection terminal Tis. A detailed description of the CR filter will be given later.

FIG. 7 is a circuit diagram showing a conventional circuit that carries out slope compensation and generates a PWM pulse (PWMPULSE) for driving a power transistor. FIG. 8 shows an example of operational waveforms of the circuit in FIG. 7, and FIG. 9 shows another example of operation waveforms of the circuit in FIG. 7. Where the voltage value of a signal applied to a current detection terminal Tis is Vis, resistances R4 and R5 (resistance values thereof also are denoted by R4 and R5; the same will apply hereinafter) synthesize a slope compensation signal Vsl_in1 and a voltage value Vis to generate a signal Vsl_out. It should be noted that the slope compensation signal Vsl_in1 is generated by an operational amplifier, not shown, and is not affected (interfered with) by the value of the voltage Vis. The amplitude of the signal Vsl_out (which will also be denoted by Vsl_out; the same will apply hereinafter) is expressed by the following equation:

$$Vsl\_out = Vsl\_in1 \cdot R5/(R4+R5) + Vis \cdot R4/(R4+R5) \quad (1)$$

FIG. 8 shows waveforms in a case where measures are taken to cope with an ON time reversal phenomenon as disclosed in Japanese Laid-Open Patent Publication (Kokai) No. 2004-40856. FIG. 9 shows waveforms in a case where no measures are taken to cope with an ON time reversal phenomenon as in conventional art disclosed prior to Japanese Laid-Open Patent Publication (Kokai) No. 2004-40856.

The voltage Vis, which is originally a voltage across the resistance R2 shown in FIG. 6, becomes a monotonously increasing signal during a time period Ton during which the power transistor PT1 is on. The waveform of the voltage Vis is the same in FIGS. 8 and 9. The slope compensation signal Vsl_in1 is a signal that monotonously increases during the time period Ton. If measures are taken to cope with an ON time reversal phenomenon, the slope compensation signal Vsl_in1 starts rising in the middle of the time period Ton, as shown in FIG. 8. On the other hand, if no measures are taken to cope with an ON time reversal phenomenon, the slope compensation signal Vsl_in1 starts rising from the beginning of the time period Ton, as shown in FIG. 9.

Then, the signal Vsl_out obtained by weighted addition of the voltage Vis and the slope compensation signal Vs1_in1 in accordance with the above equation (1), is input to the non-inverting input terminal of a PWM comparator PWMCMP.

The feedback signal FB, the voltage of which has dropped by an amount equal to the forward voltage of diode D11, is divided by resistances R11 and R12 and input to the inverting input terminal of the PWM comparator PWMCMP. The PWM comparator compares the signal Vsl_out and the dropped feedback signal FB to generate a PWM signal PWM-PULSE for turning on and off the power transistor PT1. If the PWM signal PWMPULSE is L (Low), the controller 1 turns on the power transistor PT1, and if the PWM signal PWM-PULSE is H (High), the controller 1 turns off the power transistor PT1.

Here, spike noise (a glitch), generated in the voltage Vin upon turning-on the power transistor PT1, presents a problem. FIG. 10 shows the waveform of the voltage Vin with a glitch superimposed thereon. The glitch is also superimposed on the signal Vsl_out in accordance with the above equation (1) and is input to the non-inverting input terminal of the PWM comparator PWMCMP, and hence the PWM comparator PWMCMP may malfunction. Malfunctioning of the PWM comparator presents a more serious problem if an output from the PWM comparator PWMCMP is stored temporarily in a storage device such as a flip-flop and then turning-on/off of the power transistor PT1 is controlled.

To address this problem, the CR filter comprised of the resistance R3 and the capacitor C4 is provided as mentioned above. The CR filter filters spike noise (the glitch) generated in the voltage Vin at turning-on of the power transistor PT1 so as to prevent the PWM comparator from malfunctioning. The time constant of the CR filter is set to, for example, about 1 μs relative to a switching cycle of 10 μs. In this case, the resistance value of the resistance R3 is, for example, 1 kΩ, and the resistance values of the resistances R4 and R5 are 100 kΩ and 2.7 kΩ, respectively.

As described above, if spike noise (a glitch) generated in the voltage Vin at the turning-on of the power transistor PT1 presents a problem, the CR filter comprised of the resistance R3 and the capacitor C4 copes with this problem. However, since the resistance R3 is provided, the resistance R5 substantially changes into a resistance R5+R3 (in the above example, the resistance value changes from 2.7 kΩ to 3.7 kΩ), and as a consequence, the signal Vsl_out also changes in accordance with the above equation (1). In other words, depending on whether the CR filter is present or not, the PWM comparator PWMCMP operates differently with respect to the same signal Vis, and eventually the output voltage value changes. Since the controller 1 is usually constructed as a single integrated circuit (IC), and the CR filter is usually provided as a circuit external to the integrated circuit by a user, it is necessary that the output voltage does not change regardless of whether there is the CR filter or not.

According to claim 4 and Embodiment 3 of Japanese Laid-Open Patent Publication (Kokai) No. 2004-40856 mentioned above, "a signal obtained by superimposing a feedback signal and a slope compensation signal one upon the other" is used, but this configuration presents a problem as described below.

Specifically, a slope compensation signal is added to (superimposed on) a feedback signal of an output voltage. The slope compensation signal, which decreases from an initial positive value value, is generated first and then added to the above-mentioned feedback signal or a current detection signal. For this reason, the circuit configuration is complicated, and the circuit is large in size.

Specifically, generating a signal that decreases from an initial positive (not zero) value to zero is more difficult than generating a signal that monotonously increases from zero. Particularly, in a circuit in which an initial value of current is small and which drains electric charges from a capacitor using a constant current circuit, the voltage across the constant current circuit has to be close to zero. Even if a current mirror circuit is used, the source-to-drain junction enters the nonsaturation region when it comes close to zero, and hence the current mirror circuit cannot function properly. That is, current cannot be constant. Also, the circuit has to be large in size to include a circuit for setting an initial value.

SUMMARY OF THE INVENTION

It is an object of the invention to provide a switching power supply which can prevent subharmonic oscillation of a pulse signal for current-mode control with a simple circuit configuration and a small circuit and also can accurately control the output voltage even if a CR filter is provided between a resistance for detecting current and a current detection terminal of a controller.

To attain the above object, the present invention provides a switching power supply in which a switching element turns on and off electric current flowing on a primary side of an output transformer so as to rectify and output a pulsating flow generated on a secondary side of the output transformer, including a voltage detecting section that detects a rectified output voltage, a current detecting section that detects electric current flowing through the switching element, a controller that compares a voltage detection signal from the voltage detecting section and a current detection signal from the current detecting section to control a duty of the switching element during an ON time, and a slope compensation circuit that compensates a rate of change of the voltage detection signal by a slope compensation signal, wherein the slope compensation circuit subtracts the slope compensation signal from the voltage detection signal.

With the switching power supply described above, since slope compensation is carried out by subtracting a slope compensation signal from an output voltage detection signal, it is possible to accurately control turning-on/off of the switching element and also to prevent subharmonic oscillation of a pulse signal for current-mode control with a simple circuit configuration and a small circuit size.

DETAILED DESCRIPTION OF THE PREFERRED EMBODIMENTS

The present invention will now be described in detail with reference to the drawings showing a preferred embodiment thereof.

Figure 1:
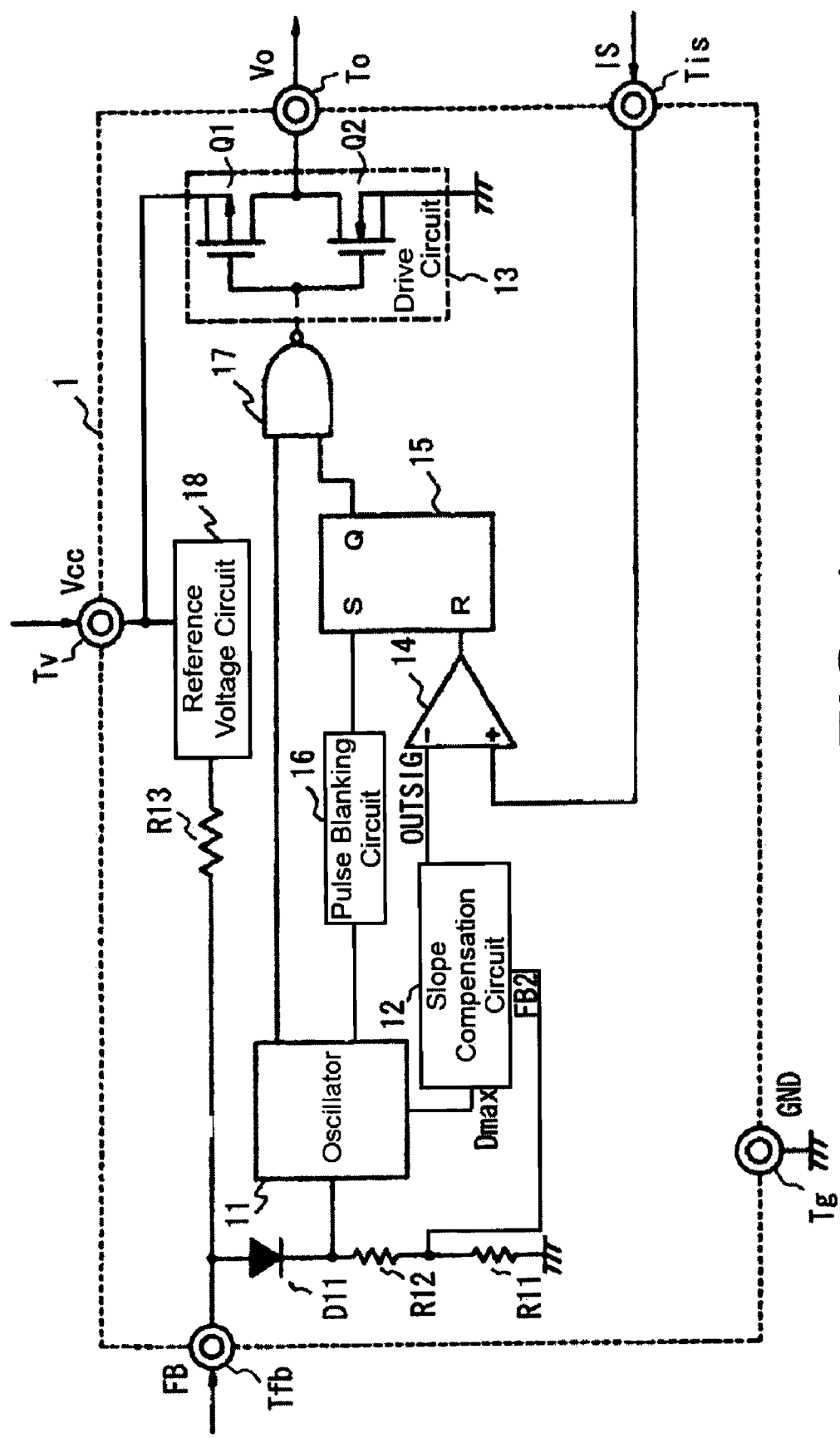
FIG. 1 is a diagram showing an example of the construction of a controller according to an embodiment of the present invention.
Figure 6:
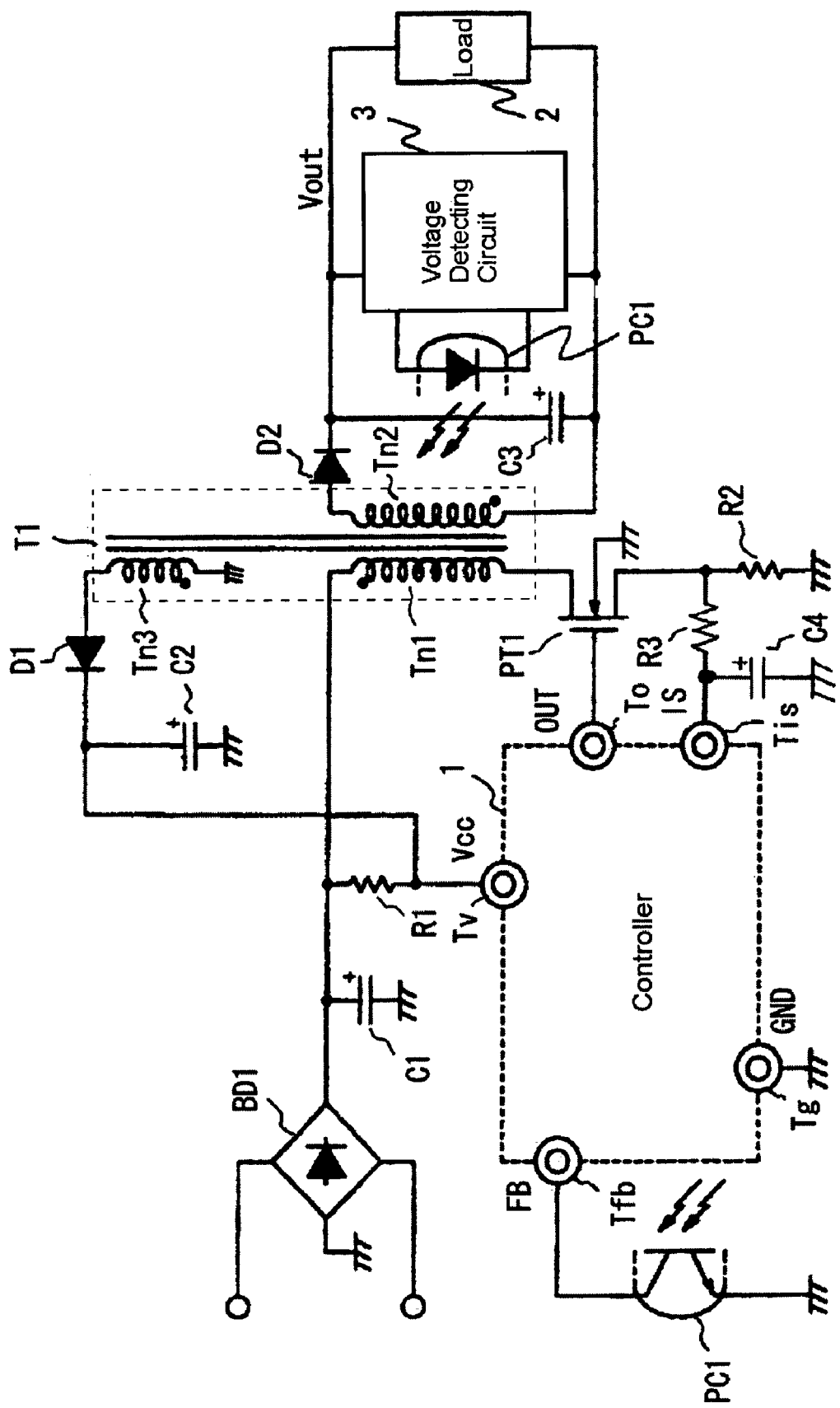
FIG. 6 is a circuit configuration diagram showing an example of a switching power supply that carries out current-mode control.
Figure 7:
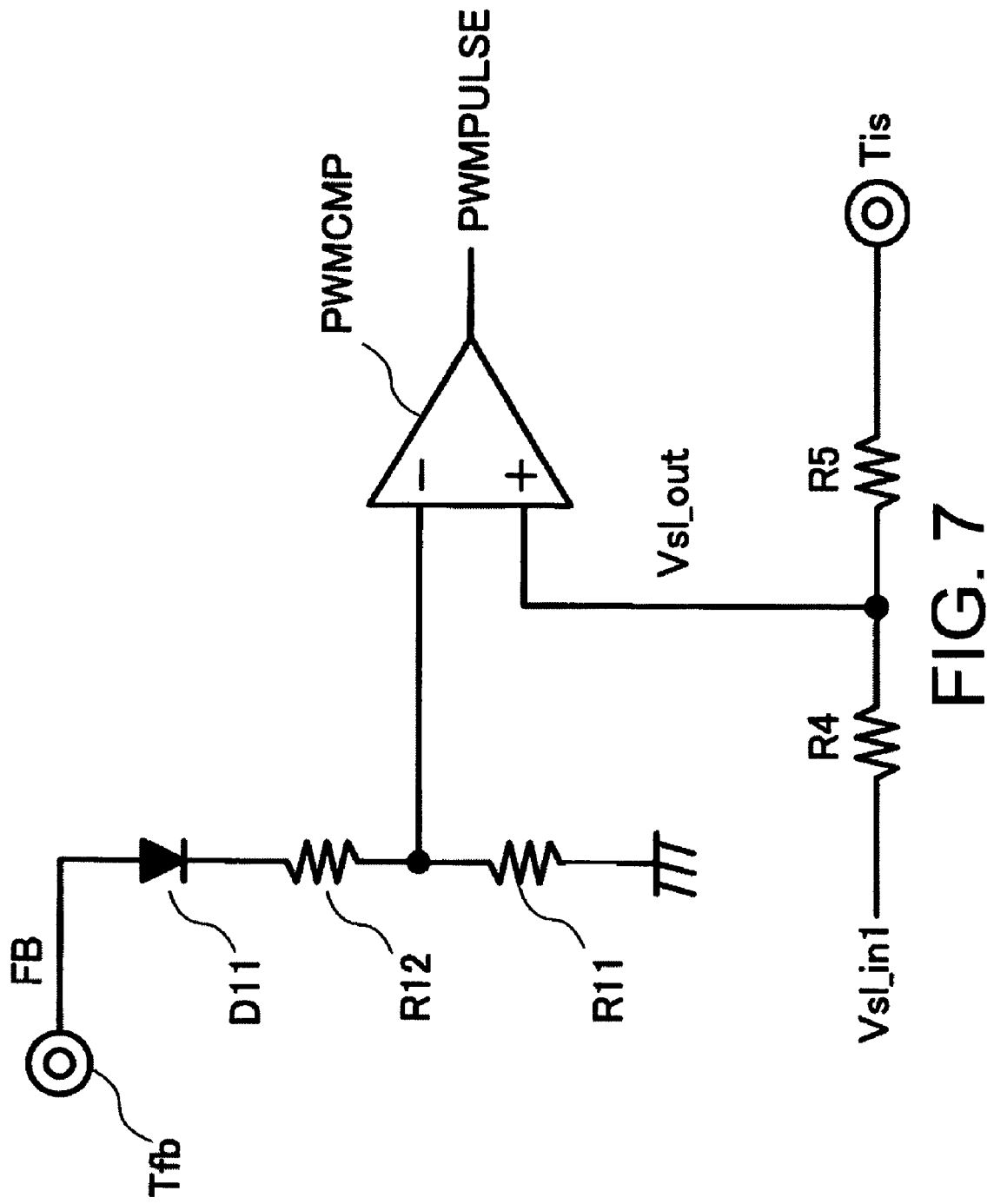
FIG. 7 is a circuit configuration diagram showing a conventional circuit that carries out slope compensation and generates a PWM pulse for driving a power transistor.

A switching power supply according to an embodiment of the present invention is identical in overall construction with the construction in FIG. 6. FIG. 1 is a diagram showing an example of the construction of a controller 1 according to the embodiment. The controller 1 is comprised of an oscillator 11 that determines the frequency of a pulse signal for turning on/off a power transistor PT1 (i.e. decreases the frequency at light load) according to a feedback signal FB from a voltage detecting circuit 3, a slope compensation circuit 12 for carrying out slope compensation, described later; a drive circuit 13 comprised of a series circuit consisting of a P-channel MOS transistor Q1 and an N-channel MOS transistor Q2 for driving the power transistor PT1, a PWM comparator that generates a pulse-width modulated pulse signal, a flip-flop 15, a pulse blanking circuit 16, a NAND gate 17, and a 5V-reference voltage circuit 18.

The feedback signal FB is input to the oscillator 11 via a diode D11, and a voltage FB2 obtained by dividing the feedback signal FB having passed through the diode D11 by a resistance R11 and a resistance R12 is input to the slope compensation circuit 12. A signal OUTSIG obtained as a result of slope compensation by the slope compensation circuit 12 is input the inverting input terminal of the PWM comparator 14.

Figure 2:
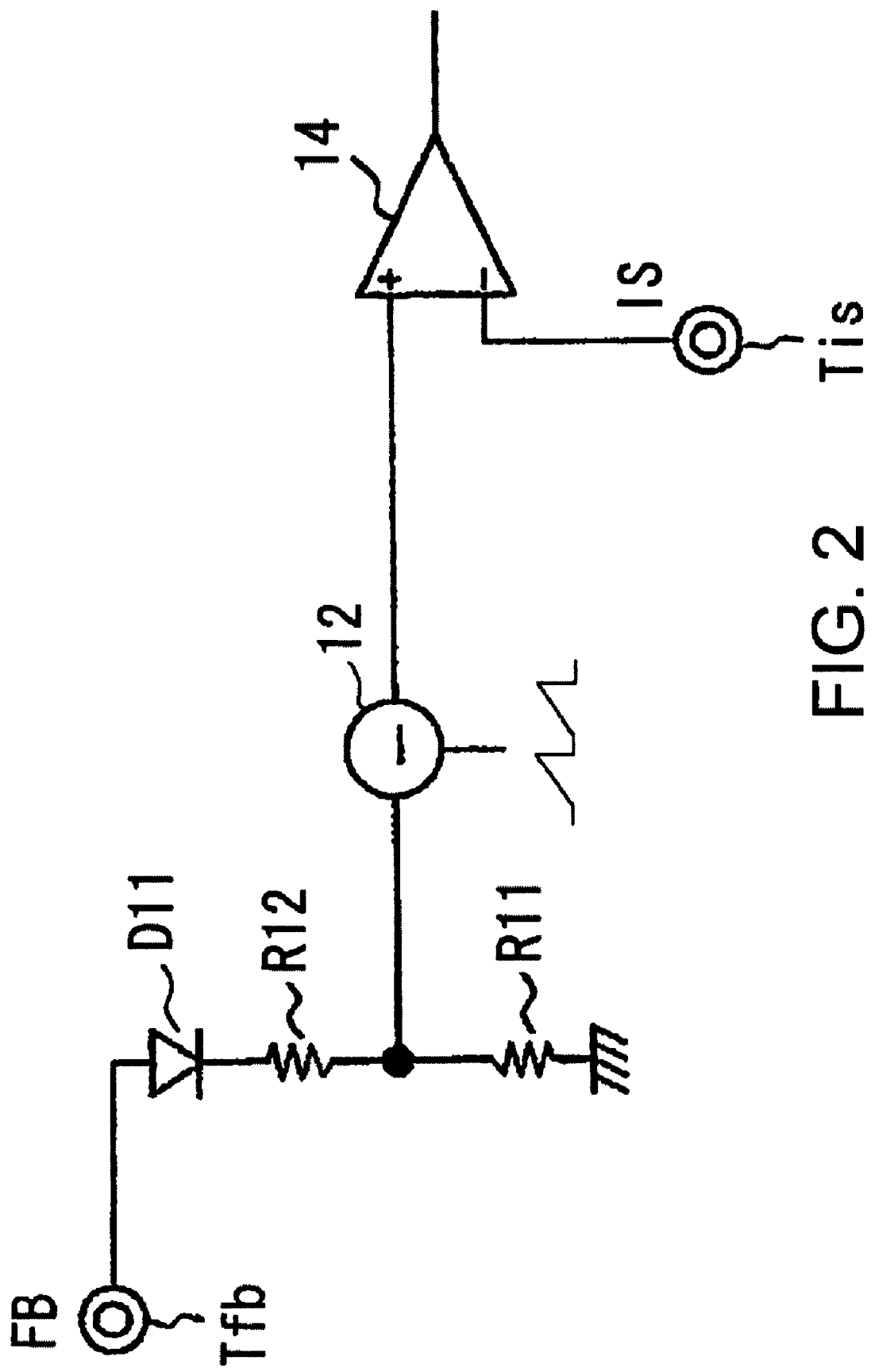
FIG. 2 is a diagram showing an example of the configuration of a slope compensating section in a switching power supply according to the embodiment.
Figure 3:
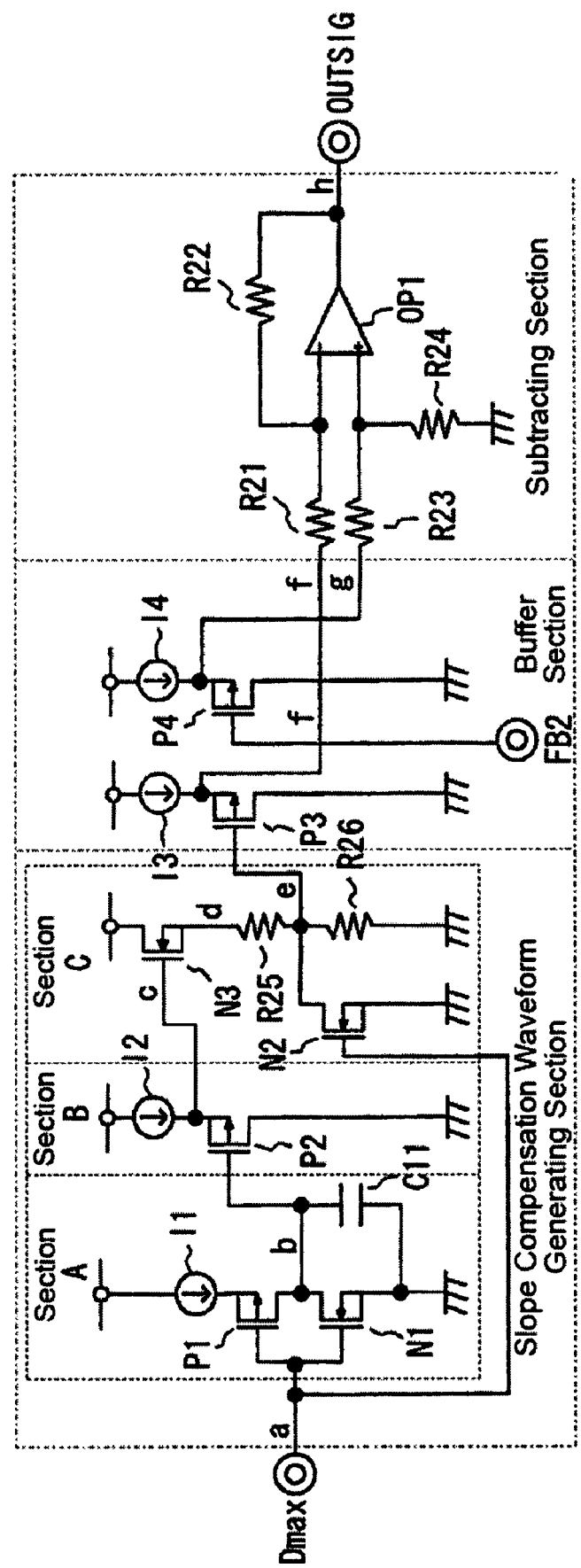
FIG. 3 is a circuit configuration diagram showing an example of a slope compensation circuit according to the embodiment.
Figure 4:
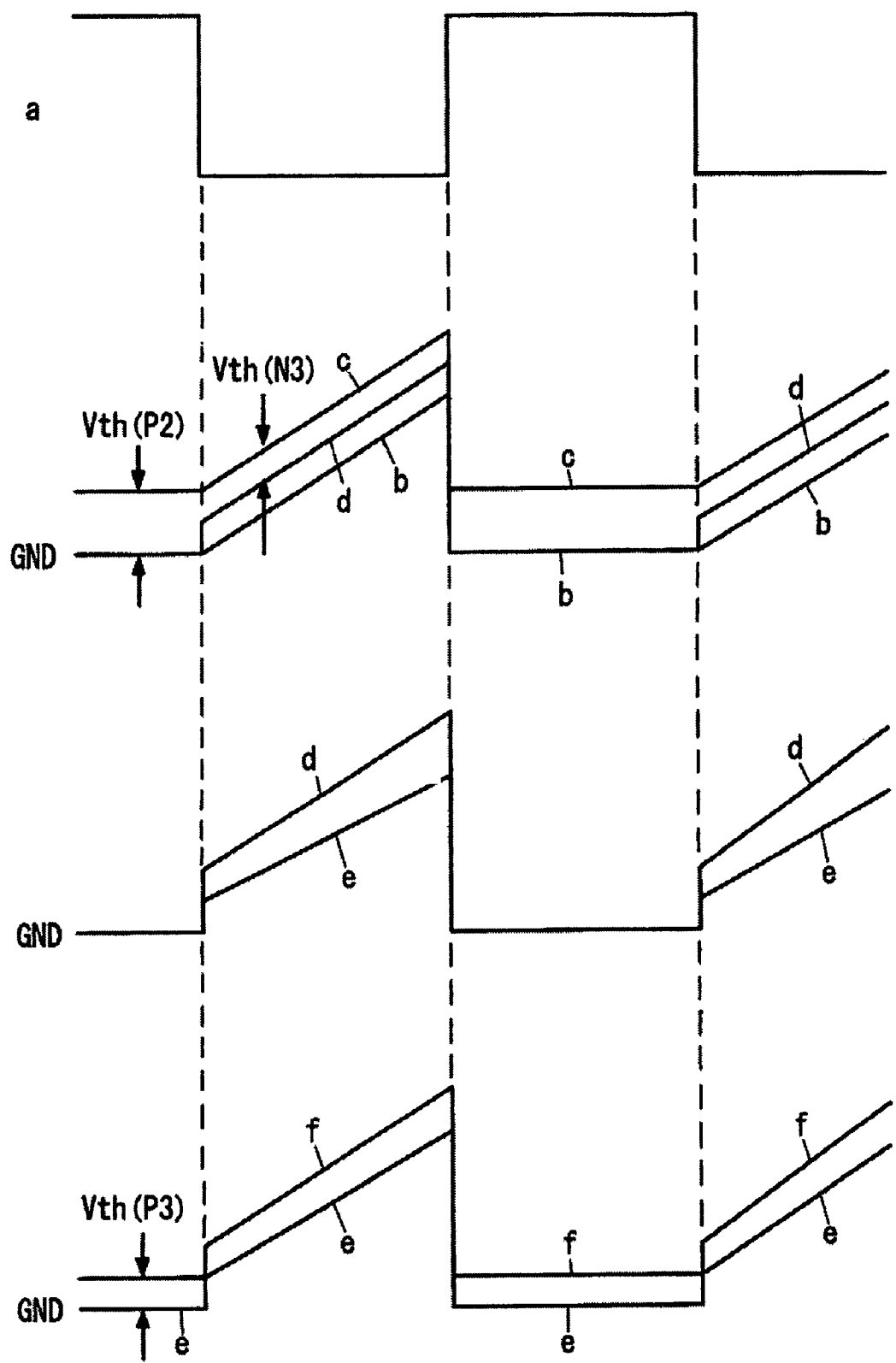
FIG. 4 is a diagram showing signal waveforms of respective components of the slope compensation circuit in FIG. 3.

FIG. 2 is a diagram showing an example of a slope compensating section of the switching power supply according to the present embodiment. A slope compensation signal, which has a sawtooth waveform, is subtracted from a detection signal obtained from a feedback terminal Tfb, and the resulting signal is input to the PWM comparator 14. FIG. 3 is a diagram showing an example of the configuration of the slope compensation circuit 12 according to the present embodiment. FIG. 4 is a diagram showing signal waveforms of respective components of the slope compensation circuit 12 in FIG. 3. The slope compensation circuit 12 is comprised of a slope compensation waveform generating section to which a duty max signal Dmax (square wave) is input, a buffer section to which the signal FB2 from the feedback terminal Tfb is input, and a subtracting section that outputs the signal OUTSIG to the PWM comparator 14. In FIG. 3, references P1 to P4 denote P-channel transistors; N1 to N3, N-channel transistors; R21 to R26, resistances; 11 to 14, constant current sources; and OP1, an operational amplifier.

In the slope compensation waveform generating section, first, a sawtooth waveform generating circuit of a section A carries out charging and discharging of a capacitor C11 to generate a sawtooth waveform. When the P-channel transistor P1 is on, the capacitor C11 is charged by constant current, and the voltage (signal b) across the capacitor C11 increases in proportion to time. When the N-channel transistor N1 is turned on, the capacitor C11 is discharged, and the level of the signal b immediately becomes zero (GND level). Then, the sawtooth wave is buffered by a buffer circuit of a section B, and the voltage level is adjusted by a voltage level adjusting circuit of a section C. In the buffer section, the slope compensation signal thus generated and the signal from the feedback terminal Tfb are buffered. The N-channel transistor N2 cancels an offset based on a difference in (the absolute value of) threshold voltage between the P-channel transistor P2 and the N-channel transistor N3 so that the L (Low)-side level of a signal e can be reliably caused to become zero. In the subtracting section, the operational amplifier OP1 subtracts the slope compensation signal f from a signal g obtained by buffering the signal FB2 from the feedback terminal Tfb to carry out slope compensation on a signal that is to be input to the feedback terminal Tfb.

FIG. 4 is a diagram showing the waveforms of signals (a to f) in the components of the above described slope compensation circuit 12 in FIG. 3. Vth (P2) denotes the threshold voltage of the transistor P2, Vth (N3) denotes the threshold voltage of the transistor NT3, and Vth (P3) denotes the threshold voltage of the transistor P3. An output signal h is expressed by the following equation:

$$h=-(R21/R22)f+[R24(R21+R23)/R21(R23+R24)]g$$

In this case, where R22/R21=R24/R23, the output signal h is expressed by the following equation:

$$h=-(R21/R22)(f-g).$$

Figure 8:
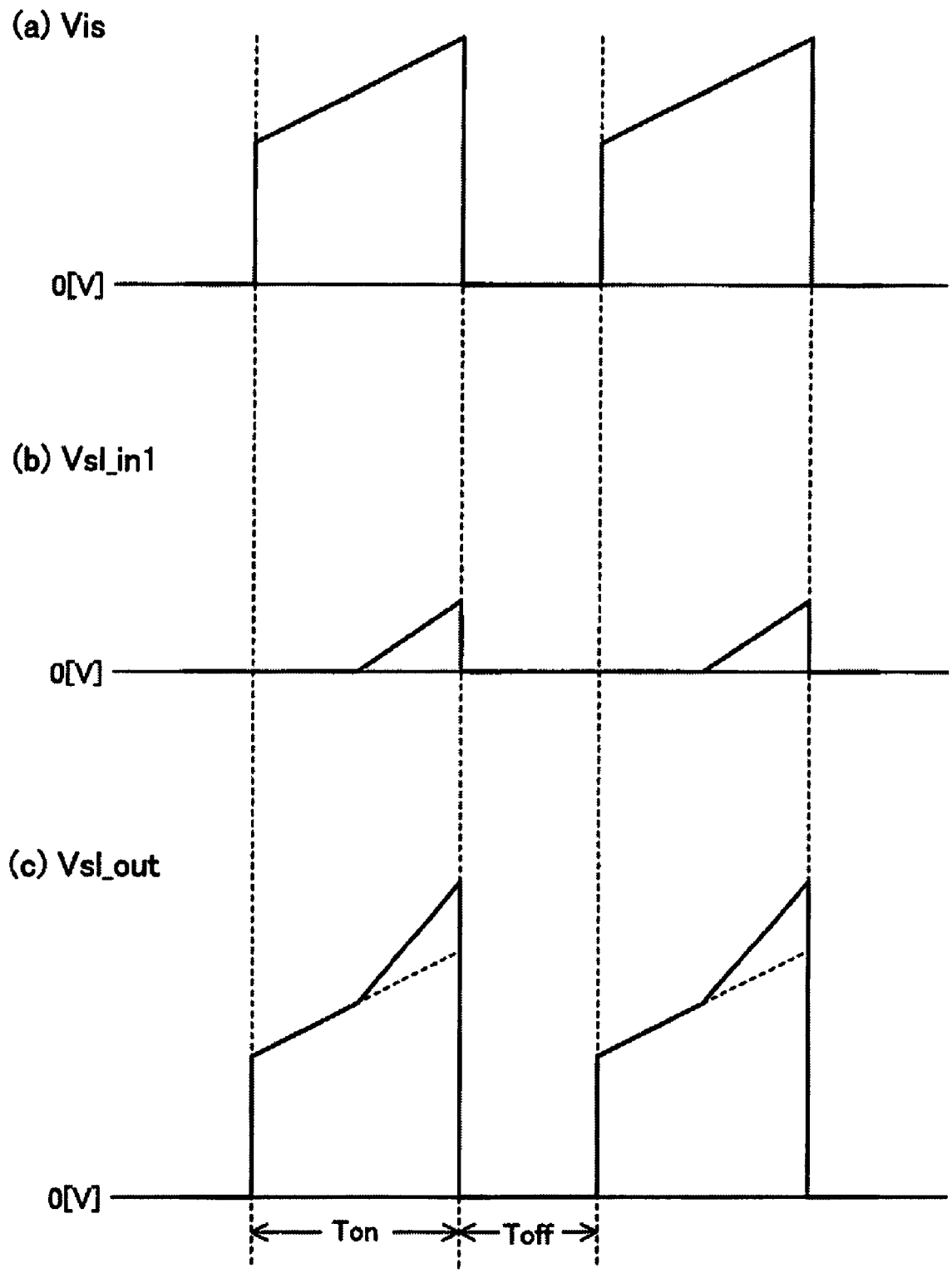
FIG. 8 is a diagram showing operation waveforms of the circuit in FIG. 7.
Figure 9:
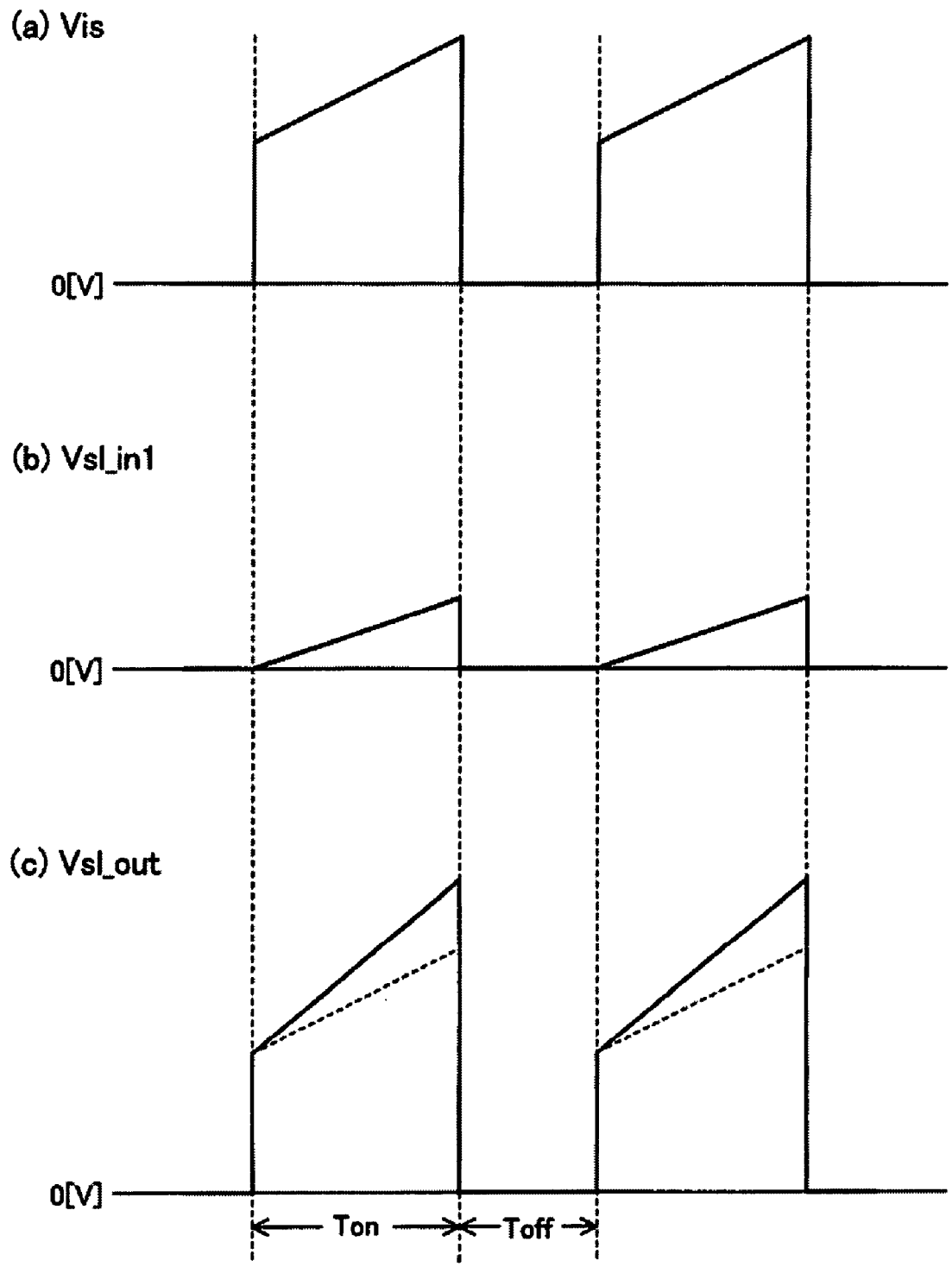
FIG. 9 is a diagram showing other operation waveforms of the circuit in FIG. 7.
Figure 10:
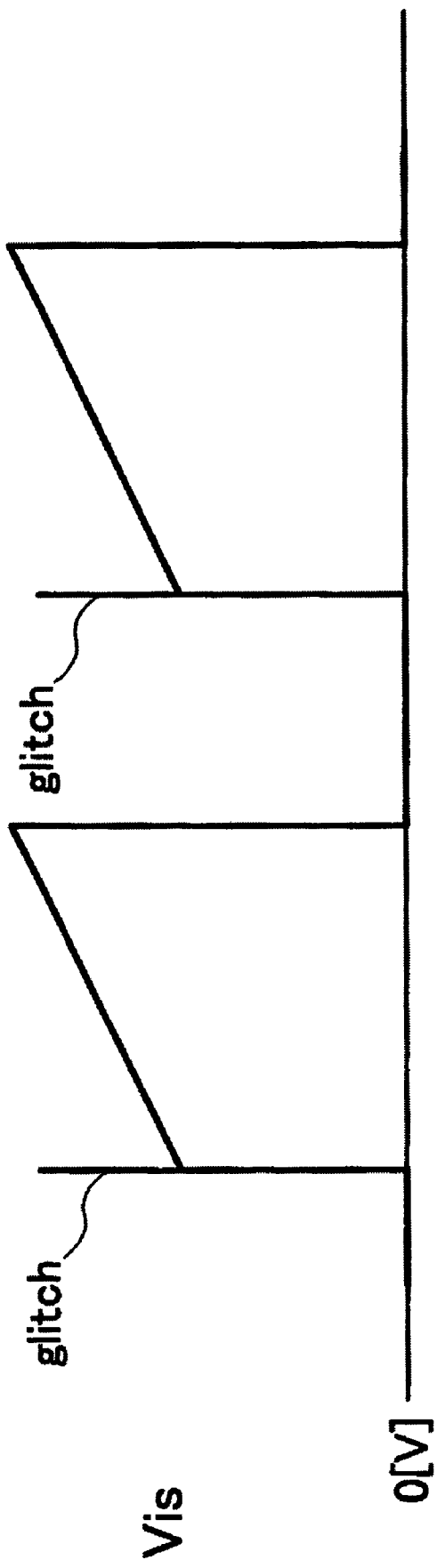
FIG. 10 is a diagram showing the voltage waveform of a signal with a glitch superimposed thereon.

FIGS. 3 and 4 show a case where no measures are taken to cope with an ON time reversal phenomenon as in the conventional art shown in FIG. 9, but a circuit for use in a case where measures are taken to an ON time reversal phenomenon as shown in FIG. 8 may be configured in a similar manner.

Figure 5:
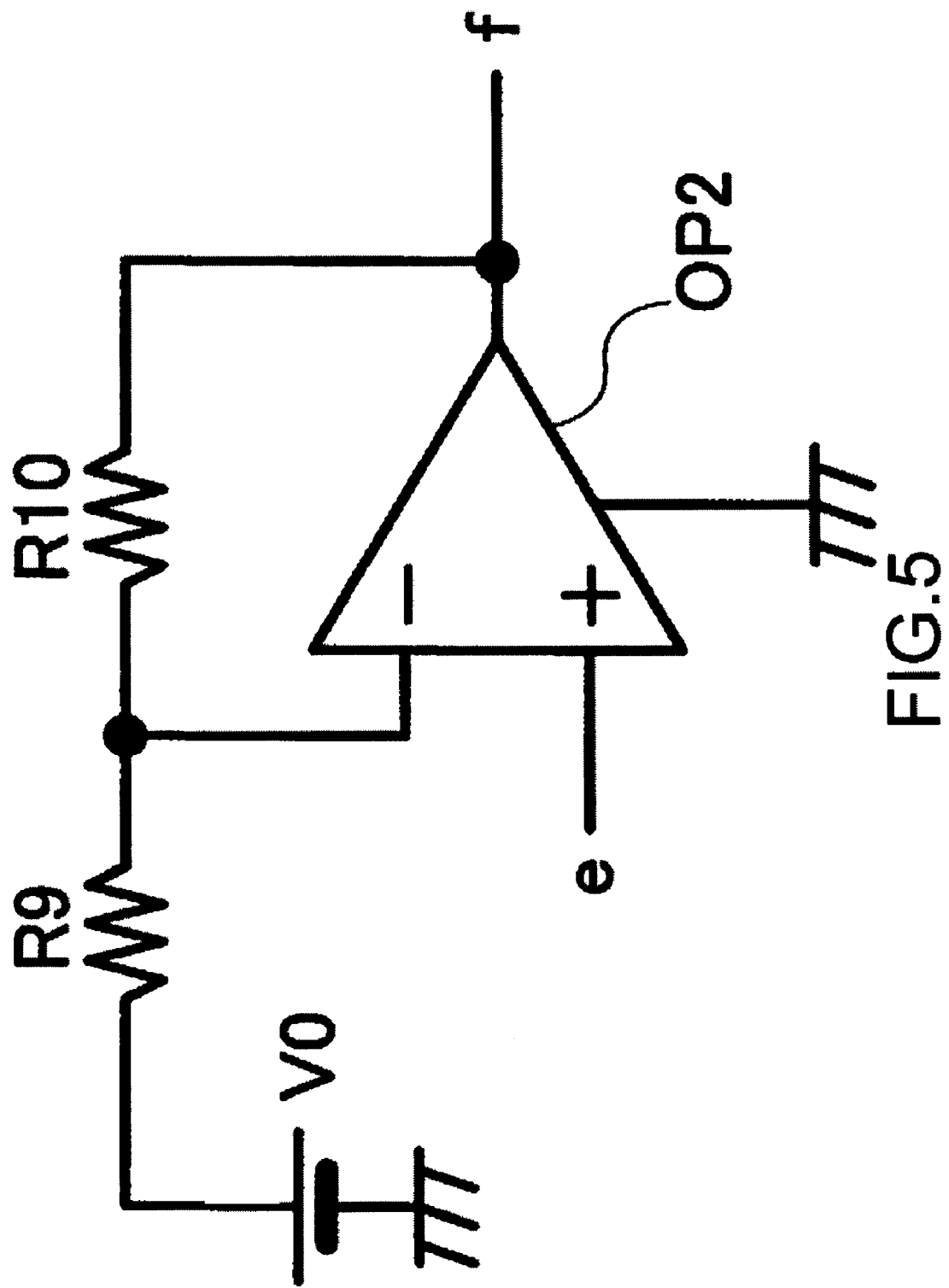
FIG. 5 is a diagram showing another example of the configuration of the slope compensating section.

FIG. 5 is a diagram showing another example of the configuration of the slope compensating section. In FIG. 5, there is shown a part of the buffer section of the controller 1 that copes with the inversion phenomenon during the ON time according to the present embodiment. The circuit in FIG. 5 is comprised of a reference voltage source V0, an operational amplifier OP2 of which negative-side power supply is zero (GND level), a resistance R10 connected between the inverting input terminal and the output terminal of the operational amplifier OP2, and a resistance R9 connected between the reference voltage source V0 and the inverting input terminal of the operational amplifier OP2. The controller 1 is constructed by replacing the circuit block of FIG. 4 comprised of the constant current source 13 and the P-channel transistor P3 with the circuit in FIG. 5. Specifically, the signal input to the gate of the P-channel transistor P3 is input to the non-inverting input terminal of the operational amplifier OP2, and the signal f output from the source of the P-channel transistor P3 is output from the output terminal of the operational amplifier OP2. Except for this, the slope compensating section in the illustrated example is identical in configuration with the slope compensating section in FIG. 3.

The circuit in FIG. 5 is a subtraction circuit of which output signal f is expressed by the following equation:

$$f=[(R9+R10)/R9]e-(R10/R9)V0 \quad (2)$$

As described above, since the negative power supply of the operational amplifier OP2 is zero (GND level), a signal with a level 0 (GND level) is output from the operational amplifier OP2 in a time period during which the result of the equation (2) is negative. The signal f increases only after the signal f becomes greater than zero, that is, e>[R10/(R9+R10)] V0. As a result, the signal f with the same waveform as the waveform of the signal Vs1_in1 shown in FIG. 8(b) can be obtained.

Thereafter, the subtracting section may subtract the signal f from the signal g in a similar manner.

In the conventional art, the CR filter is inserted into the current detection terminal Tis so as to cut off spike noise of the power transistor PT1, the PWM comparator 14 cannot be controlled with accuracy if slope compensation is carried out on the current detection terminal Tis side. Specifically, since this CR filter has a predetermined time constant with respect to a switching cycle, a signal that is actually input to the PWM comparator changes, and hence the PWM comparator 14 cannot be controlled with accuracy.

On the other hand, in the present embodiment, slope compensation is carried out on a signal from the feedback terminal Tfb, not on a signal from the current detection terminal Tis. In other words, instead of adding a slope compensation signal to a signal from the current detection terminal Tis and comparing the signal with a signal from the feedback terminal Tfb, a slope compensation signal is subtracted from a signal from the feedback terminal Tfb and the resulting signal is compared with a signal from the current detection terminal Tis. Thus, even if the CR filter is inserted into the current detection terminal Tis, this does not affect the control of the PWM comparator 14.

Also, in the present embodiment, since a signal that monotonously increases from zero is generated, signal generation is easy, and there is no need for a circuit that sets an initial value, resulting in reduction in circuit size.

It will be appreciated by those skilled in the art that the invention may be practiced otherwise than as specifically described in the preferred embodiments without departing from the scope thereof.

What is claimed is:

1. A switching power supply in which a switching element turns on and off a primary current flowing on a primary side of a transformer and a rectifier rectifies a secondary current on a secondary side of the transformer, thereby providing a pulsating rectified output voltage, comprising:
   a voltage detecting section that detects the rectified output voltage;
   a current detecting section that detects the primary current;
   a controller that compares a voltage detection signal from said voltage detecting section and a current detection signal from said current detecting section to control a duty of the switching element during an ON time; and
   a slope compensation circuit that compensates a rate of change of the voltage detection signal by a slope compensation signal,
   wherein said slope compensation circuit subtracts the slope compensation signal from the voltage detection signal.

2. The switching power supply according to claim 1, wherein said slope compensation circuit uses an operational amplifier to subtract the slope compensation signal from the voltage detection signal.

3. The switching power supply according to claim 1, wherein said slope compensation signal comprises a signal having a sawtooth waveform.

4. The switching power supply according to claim 1, wherein said slope compensation signal is a signal that monotonously increases during the ON time.

5. The switching power supply according to claim 1, wherein a filter is provided between the current detecting section and a current detection terminal of the controller.

6. A method of controlling a switching power supply in which a switching element turns on and off a primary current flowing on a primary side of a transformer and a rectifier rectifies a secondary current on a secondary side of the transformer, thereby providing a pulsating rectified output voltage, the method comprising the steps of:
   detecting the rectified output voltage;
   detecting the primary current;
   comparing a voltage detection signal representing said rectified output voltage and a current detection signal representing said primary current;
   controlling a duty of the switching element during an ON time, responsive to a result of the step of comparing;
   subtracting a slope compensation signal from the voltage detection signal; and
   thereby compensating a rate of change of the voltage detection signal by the slope compensation signal.

7. The method according to claim 6, wherein an operational amplifier subtracts the slope compensation signal from the voltage detection signal.

8. The method according to claim 6, wherein said slope compensation signal comprises a signal having a sawtooth waveform.

9. The method according to claim 6, wherein said slope compensation signal is a signal that monotonously increases during the ON time.

10. The method according to claim 6, further comprising a step of filtering said current detection signal before said step of comparing.

* * * * *